(12) United States Patent
Obrecht

(10) Patent No.: US 10,209,681 B2
(45) Date of Patent: Feb. 19, 2019

(54) SAFETY ARCHITECTURE FOR FAILSAFE SYSTEMS

(71) Applicant: Siemens Aktiengesellschaft, Munich (DE)

(72) Inventor: Klaus Obrecht, Baden-Baden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 240 days.

(21) Appl. No.: 15/075,608

(22) Filed: Mar. 21, 2016

(65) Prior Publication Data

US 2016/0282818 A1   Sep. 29, 2016

(30) Foreign Application Priority Data

Mar. 23, 2015  (EP) ..................... 15160378

(51) Int. Cl.
| | | |
|---|---|---|
| G05B 9/03 | (2006.01) | |
| G05B 19/05 | (2006.01) | |
| G05B 23/02 | (2006.01) | |

(52) U.S. Cl.
CPC ............ G05B 9/03 (2013.01); G05B 19/058 (2013.01); G05B 23/027 (2013.01); G05B 23/0259 (2013.01)

(58) Field of Classification Search
None
See application file for complete search history.

(56) References Cited

U.S. PATENT DOCUMENTS

| | | | | |
|---|---|---|---|---|
| 3,593,307 A | * | 7/1971 | Gouge, Jr. ............ | G05B 9/03 700/81 |
| 3,751,684 A | * | 8/1973 | Struger ................ | G05B 19/048 326/14 |
| 4,631,693 A | * | 12/1986 | Neri ..................... | G05B 19/042 324/514 |
| 4,646,227 A | * | 2/1987 | Corbin ............... | G05B 23/0235 700/79 |
| 4,852,046 A | * | 7/1989 | Jones .................. | G05B 19/045 700/79 |

(Continued)

FOREIGN PATENT DOCUMENTS

| | | | | |
|---|---|---|---|---|
| CN | 1622450 A | 6/2005 | ............... | H03F 3/04 |
| CN | 101373388 A | 2/2009 | ............... | G05F 1/56 |

(Continued)

*Primary Examiner* — Ponnoreay Pich
(74) *Attorney, Agent, or Firm* — Slayden Grubert Beard PLLC

(57) ABSTRACT

A safety device includes a monitoring unit, a test block and an output stage having at least one contact member. The monitoring unit includes at least two outputs and provides at least two, different output signals for testing its absence from faults. The monitoring unit provides at least one enabling signal for a switch-off function The test block includes at least one input and is configured to monitor at least one of the output signals of the monitoring unit. The test block also includes at least one output and provides at least one enabling signal for a switch-off function. The at least one contact member of the output stage has at least two inputs and is configured to link at least one of the output signals of the monitoring unit to the at least one enabling signal of the test block.

17 Claims, 4 Drawing Sheets

(56) References Cited

U.S. PATENT DOCUMENTS

| | | | | |
|---|---|---|---|---|
| 4,866,596 A | * | 9/1989 | Heilman | G05B 19/058 |
| | | | | 700/24 |
| 5,343,461 A | * | 8/1994 | Barton | H04J 3/14 |
| | | | | 370/249 |
| 6,176,247 B1 | | 1/2001 | Winchcomb et al. | 137/14 |
| 2005/0110574 A1 | | 5/2005 | Richard et al. | 330/297 |

FOREIGN PATENT DOCUMENTS

| | | | | |
|---|---|---|---|---|
| RU | 2159895 C1 | 11/2000 | | F23D 17/00 |
| RU | 2223532 C2 | 2/2004 | | F16K 37/00 |
| RU | 2444037 C1 | 2/2012 | | G05B 9/02 |
| WO | 99/21066 A1 | 4/1999 | | F16K 37/00 |

* cited by examiner

SAFETY ARCHITECTURE FOR FAILSAFE SYSTEMS

CROSS-REFERENCE TO RELATED APPLICATIONS

This application claims priority to EP Application No. 15160378.4 filed Mar. 23, 2015, the contents of which are hereby incorporated by reference in their entirety.

TECHNICAL FIELD

The present disclosure relates to a safety architecture, in particular to a safety device for burner systems. Failsafe protection is an integral part of safety architecture according to the present disclosure.

BACKGROUND

Safety architectures, amongst other things, are addressed in the IEC 61508 Standard. The second edition of this standard was published in 2010. It relates to the functional safety of electrical/electronic/programmable safety-related systems.

The Standards EN13611—safety, regulating and control devices for gas burners and gas appliances—from 2011 and EN 60730—automatic electrical regulating and control devices for household and similar use—also from 2011 describe minimum requirements for safety systems.

Safety-related control systems are known from the fields of burner systems, automation technology, medical technology and vehicle technology, amongst others.

It is known in the prior art that, in systems for safety-critical tasks, measures have to be taken to protect against malfunctions. For example, this includes the monitoring of function blocks of a safety device by means of test signals. Also known is the multi-channel embodiment of a safety architecture with results comparison.

Randomly occurring (and also optionally systematically occurring) faults are intended to be identified using these measures. A safe state of a (burner) system or a process may be achieved by using a monitoring unit.

In the context of safety architectures and the corresponding safety circuits, a differentiation is made between fault-tolerant and failsafe architectures. Fault-tolerant architectures are characterized in that, after the occurrence of one or more faults, it also is possible for control tasks and monitoring tasks to be carried out further. In order to be able to achieve such tolerance relative to randomly occurring faults, the architectures frequently have to be constructed with a multi-channel redundancy.

In contrast to a fault-tolerant architecture, a failsafe system has to achieve a safe system state after the occurrence of a first fault. The same applies to further faults which occur. Even in such cases, the system has to achieve a safe system state. Therefore, first and second faults in the safety device have to lead to a safe system state.

In particular, the requirement for managing multiple faults often leads to multiple redundancy and thus increases the complexity of the architecture. Additionally, the multi-channel construction increases the costs of such systems. Finally, the significant complexity of the software and hardware associated with the multi-channel construction frequently does not contribute to the actual fulfillment of the control task and/or regulating task of a system.

SUMMARY

One embodiment provides a safety device comprising a monitoring unit, a test block and an output stage having at least one contact member, wherein the monitoring unit comprises at least two, e.g., at least three, outputs and is configured to provide at least two, e.g., at least three, different output signals for testing its absence from faults, wherein the monitoring unit is configured to provide at least one output signal as an enabling signal for a switch-off function, wherein the test block comprises at least one input and is configured to monitor at least one of the output signals of the monitoring unit, wherein the test block comprises at least one output and is configured to provide at least one enabling signal for a switch-off function, wherein the at least one contact member of the output stage has at least two inputs and is configured to link at least one of the output signals of the monitoring unit to the at least one enabling signal of the test block in order to obtain a result, wherein the output stage provides a switch-off function by taking into consideration the result of the linking undertaken by the contact member.

In a further embodiment, the test block has a monitoring and diagnostic channel having at least one input, and wherein the at least one input of the monitoring and diagnostic channel of the test block is configured to receive at least one of the output signals of the monitoring unit.

In a further embodiment, the monitoring unit comprises a monitoring and diagnostic channel having at least one output and wherein the at least one output of the monitoring and diagnostic channel of the monitoring unit is configured to provide at least one control signal for the test block.

In a further embodiment, the output stage comprises at least one further contact member having an input, wherein the at least one further contact member of the output stage is configured to be enabled directly by one of the output signals of the monitoring unit.

In a further embodiment, the output stage provides its switch-off function by taking into consideration the enabling of the contact member.

In a further embodiment, the test block is configured to provide a feedback signal for the monitoring unit.

In a further embodiment, the monitoring unit is configured to alter at least one of the output signals of the monitoring unit cyclically into a fault signal for proving the effectiveness of the test block.

In a further embodiment, the monitoring unit is configured to alter the control signal on the at least one output of the monitoring and diagnostic channel of the monitoring unit cyclically into a fault signal for proving the effectiveness of the test block.

In a further embodiment, the monitoring unit comprises at least one input and wherein the at least one input of the monitoring unit is configured to receive a feedback signal from the test block, and wherein the monitoring unit is configured to use a feedback signal from the test block which follows a signal from the monitoring unit changed into a fault signal, for proving the effectiveness of the test block.

In a further embodiment, the monitoring unit is configured to provide an output signal when the non-effectiveness of the test block is proven, such that the reception of the output signal activates the switch-off function of the output stage by a contact member of the output stage.

In a further embodiment, the at least one contact member of the output stage is in an OPEN state or CLOSED state, and wherein the output stage comprises at least one output and is configured to provide the state of the at least one contact member as a feedback signal for the monitoring unit.

In a further embodiment, the monitoring unit comprises at least one input and wherein the at least one input of the monitoring unit is configured to receive a feedback signal from the output stage.

In a further embodiment, the monitoring unit is configured to dynamize at least one output signal of the monitoring unit for control purposes by means of test signals.

In a further embodiment, the monitoring unit comprises at least one input for receiving safety-relevant signals and wherein the monitoring unit may comprise at least one analog/digital converter for supplying at least one safety-relevant analog signal.

Another embodiment provides a burner system, e.g., a gas burner system or oil burner system, comprising a safety device as disclosed above.

BRIEF DESCRIPTION OF THE DRAWINGS

Example embodiments are described in detail below with reference to the drawings, in which.

DETAILED DESCRIPTION

Embodiments of the present invention provide an improved safety device and/or safety architecture which at least partially overcomes the aforementioned drawbacks of existing systems.

Some embodiments provide a safety architecture and/or a safety circuit which provides a cost-optimized and efficient structure for a safety device. The safety architecture and/or safety circuit is intended, in particular, to be more cost-effective than a design with multiple redundancy. At the same time, random first and second faults in the safety device are designed to result in a safe system state. Thus already after the occurrence of a first fault the safety device and/or the safety circuit according to the present disclosure is intended to initiate a (system) switch-off. A further operation is not required. A further independent fault should not lead to an unsafe system state. The safety architecture is thus intended to be failsafe.

Some embodiments provide a safety architecture and/or a safety circuit and/or a safety device which (amongst other things) produces a safe system state by interrupting the energy supply, in particular by interrupting the supply of electrical power.

Some embodiments provide a safety architecture and/or a safety circuit and/or a safety device which permits a (safety) locking.

Some embodiments provide a safety architecture and/or a safety circuit and/or a safety device which permits a plurality of (differently executed) input signals to be monitored.

Some embodiments provide a safety architecture and/or a safety circuit and/or a safety device which (at least partially) is produced on a (multicore) processor with redundancy.

Some embodiments provide a safety architecture and/or a safety circuit and/or a safety device which is configured to process safety-relevant analog or digital signals.

Some embodiments provide a safety architecture and/or a safety circuit and/or a safety device which is configured to process (initially) static signals.

Some embodiments provide a safety architecture and/or a safety circuit and/or a safety device which is configured to test itself regularly for faults.

Some embodiments provide a burner system, in particular a gas burner and/or an automotive vehicle and/or a fuel cell and/or a battery, with the disclosed safety architecture and/or the disclosed safety circuit and/or the disclosed safety device.

Figure 1:
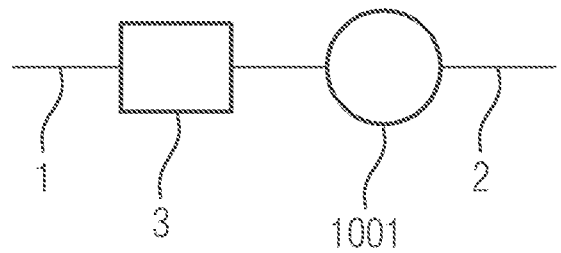
FIG. 1 shows a block diagram of a simple system with a monitoring unit which is able to perform a safety function between the input and output.

FIG. 1 shows a simple architecture 1oo1 (one out of one) having an input 1 and an output 2 and a monitoring unit 3. A malfunction or fault in the monitoring unit 3 of this simple architecture 1oo1 may result in the system no longer being able to carry out a safety function of the system. As a result, further measures are required for managing random (and optionally also systematic) faults for system safety.

Figure 2:
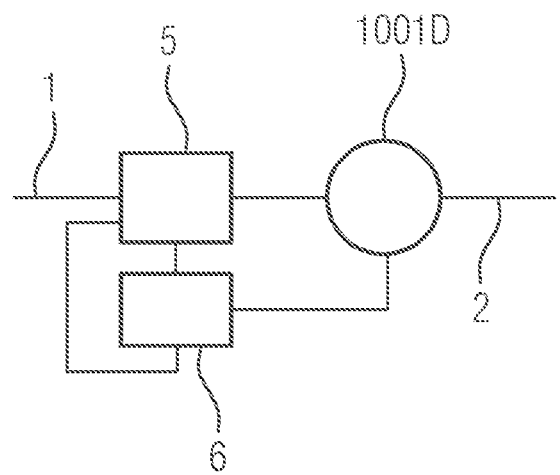
FIG. 2 shows a block diagram of a simple system with an additional monitoring and diagnostic channel.

FIG. 2 shows a so-called 1oo1D architecture (i.e. a channel with diagnosis and inherent safety). The architecture of FIG. 2 provides a monitoring unit 5 which may result initially in a safety function between the input 1 and output 2. A fault in the monitoring unit 5, however, may also lead to a malfunction of the safety function. An additional monitoring and diagnostic channel 6 ensures that a fault in the monitoring unit 5 results in a safe system state. The monitoring and diagnostic channel 6 in this case has the task, on the one hand, of identifying faults occurring in the monitoring unit 5. On the other hand, the monitoring and diagnostic channel 6 has the task of being able to achieve a safe switch-off by a further measure. The effectiveness of the measure is dependent on the diagnostic capacity of the monitoring and diagnostic channel 6.

Figure 3:
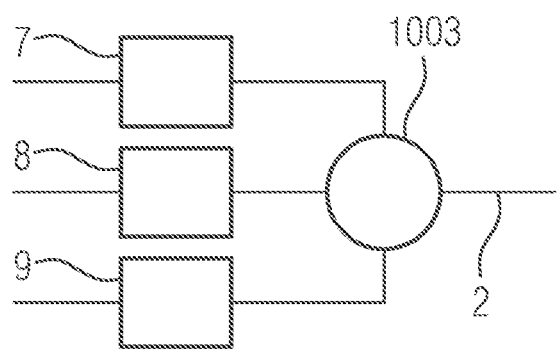
FIG. 3 shows a block diagram of a system with multiple redundancy.

In FIG. 3 shows a architecture 1oo3 (one out of three) with multiple redundancy is shown with an output 2. The malfunction of one channel or of two channels 7, 8, 9 of the monitoring unit leads to a safety-related switch-off by the third functional channel. In this case, up to two independent faults may occur in the monitoring units. Nevertheless, a safety-related switch-off of the process may be carried out. This requires, however, at least three independent monitoring units 7, 8, 9. In the simplest case the monitoring units are designed with redundancy. Further variants, such as inverse redundant functions or those with diagnostic devices, are provided and may also be used.

From the above it is shown that the complexity of the architecture rises if, in spite of multiple faults, a safe system state or safe operating state has to be achieved.

One of the objects of the present disclosure is to provide a safety architecture which guarantees failsafe performance for two independent faults. A further operation is not required after the occurrence of a first fault. The architecture, therefore, does not necessarily have to be fault-tolerant. An additional independent fault should not lead to an unsafe system state. At the same time, the architecture is intended to have an efficient and cost-effective structure.

In order to be able to reduce the number of functional units, not all monitoring units should be run repeatedly. For example, the results comparison may be carried out in the safety structure shortly before the output of the result signals. In this case, in all channels a correspondingly high degree of complexity is required in the monitoring units (see FIG. 3).

The result of a complex calculation may, for example, be simply represented by an enabling signal. In such a case, the subsequent signal processing may be reduced to the failsafe aspect of the enabling signals. The correct processing of the signal processing is thus able to be monitored in reduced form. The architecture according to the present disclosure also takes into account that the system only has to be designed to be failsafe. Fault tolerance is not necessarily required. Accordingly, a safety switch-off and optionally locking may have already been carried out after the occurrence of a first fault.

A prerequisite for a cost-effective safety architecture is the reduction of the function blocks to a minimum number of required units. The 1oo1D architecture of FIG. 2 provides a basis therefor. The first faults in the monitoring unit 5 are identified by the monitoring and diagnostic channel 6. They are controlled by a safety switch-off by the monitoring and diagnostic channel 6. The diagnostic capacity in this case has to be of high quality (and reliable) such that faults which occur are safely identified.

In other words, the diagnostic capacity may avoid and/or eliminate faults of the first type, i.e. the non-recognition of faults which occur. At the same time, the diagnostic capacity may avoid and/or eliminate faults of the second type, i.e. the identification of non-faults as faults. According to a specific embodiment, it is provided that faults in the monitoring and diagnostic channel 6 may be identified by testing the diagnostic results.

Figure 4:
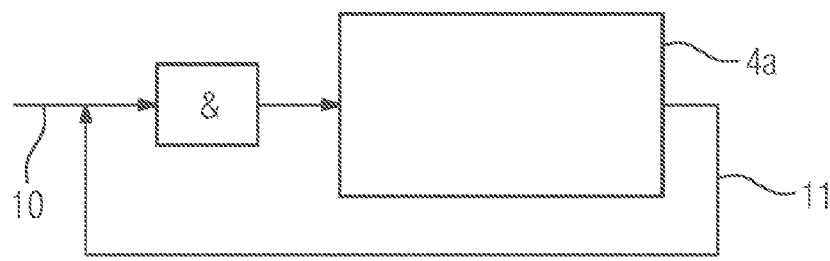
FIG. 4 illustrates using a block diagram the dynamization of signals.

As shown in FIG. 4, all static signals 10 are dynamized by additional test signals 11. The purpose is a continuous capacity for testing. The safety architecture is thus able to carry out value discrete tests and time discrete tests of the function blocks.

Figure 5:
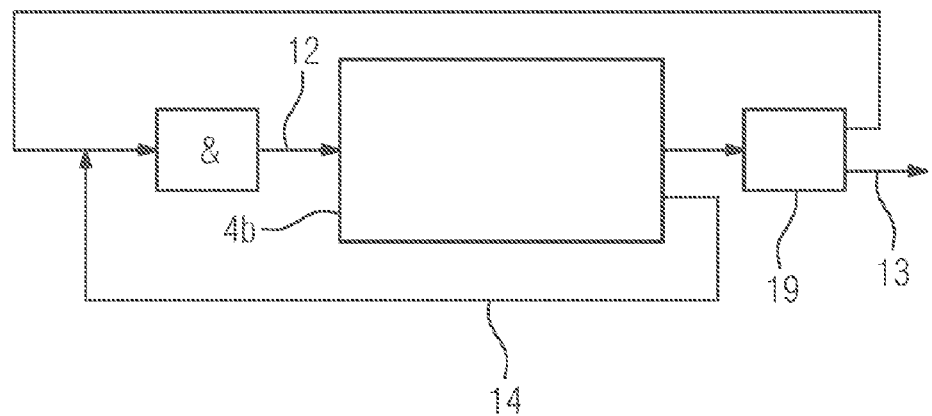
FIG. 5 illustrates using a block diagram the control of output signals by feedback.

FIG. 5 illustrates measures taken by the monitoring unit in the case of output signals 13. The output signals 13 are fed back to the control unit as input signals 12 of the monitoring unit 4b. They receive a corresponding dynamization by means of test signals 14. Thus it is possible for the monitoring unit to control initially static signals.

FIGS. 4 and 5 relate, therefore, to the dynamization by means of test signals. The monitoring device 30 of the safety device disclosed hereinafter in detail may be configured to dynamize at least one output signal 31, 37 of the monitoring device for control purposes by means of test signals. The test block 34 of the safety device disclosed hereinafter in detail may be configured to dynamize at least one output signal 35 of the test block 34 for control purposes by means of test signals. The output stage 38 of the safety device disclosed hereinafter in detail may be configured to dynamize at least one output signal 39 of the output stage 38 for control purposes by means of test signals.

The signal feedback is implemented in FIG. 5 according to an optionally present output driver and/or relay contact 19. In this manner, the value may be monitored at the output terminal.

Figure 6:
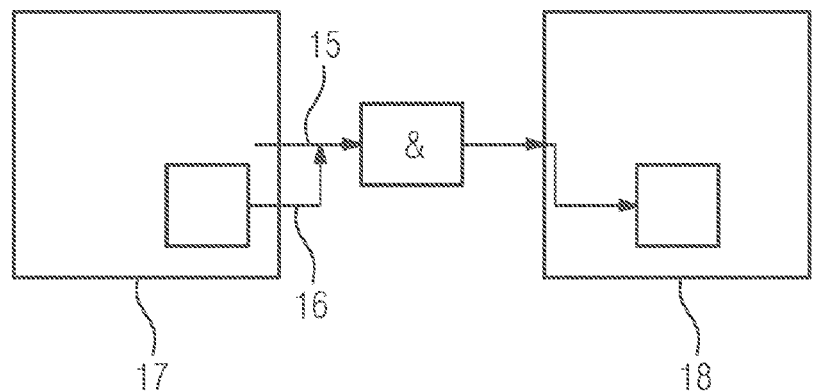
FIG. 6 describes using a block diagram measures such as redundancy and control mechanisms for preventing the falsification of digital data signals.

According to FIG. 6, digital data signals between individual functional units 17, 18 are protected against falsification by additional safety measures. In this case, additional test data 16 are added to the useful data 15. Thus an additional redundancy and an effective control mechanism are produced. Transmitting and receiving units in this case may carry out the same calculation methods or an inverse-redundant calculation.

Figure 7:
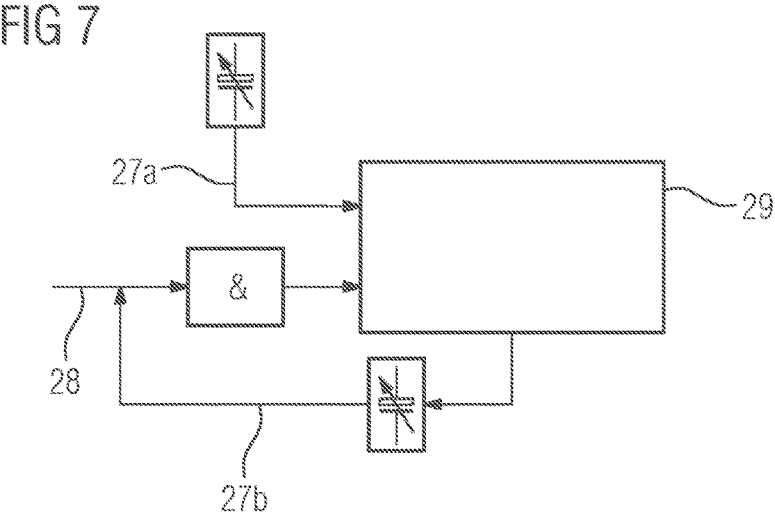
FIG. 7 describes using a block diagram different ways of supplying safety-relevant signals to the safety architecture.

According to FIG. 7, safety-relevant analog signals 28 may be supplied to the safety architecture either by redundant analog or digital converters and/or in a single channel via a signal multiplexer. According to a specific embodiment, for testing the functional capacity a defined reference signal 27a, 27b is switched to the analog input of the A/D converter of the monitoring unit for analog signals 29 via an adjustable voltage reference. Subsequently, testing is carried out.

By means of this dynamization of the interface signals, all input signals run on a single channel obtain an additional possibility for control. Output signals may be controlled by feedback to inputs.

Figure 8:
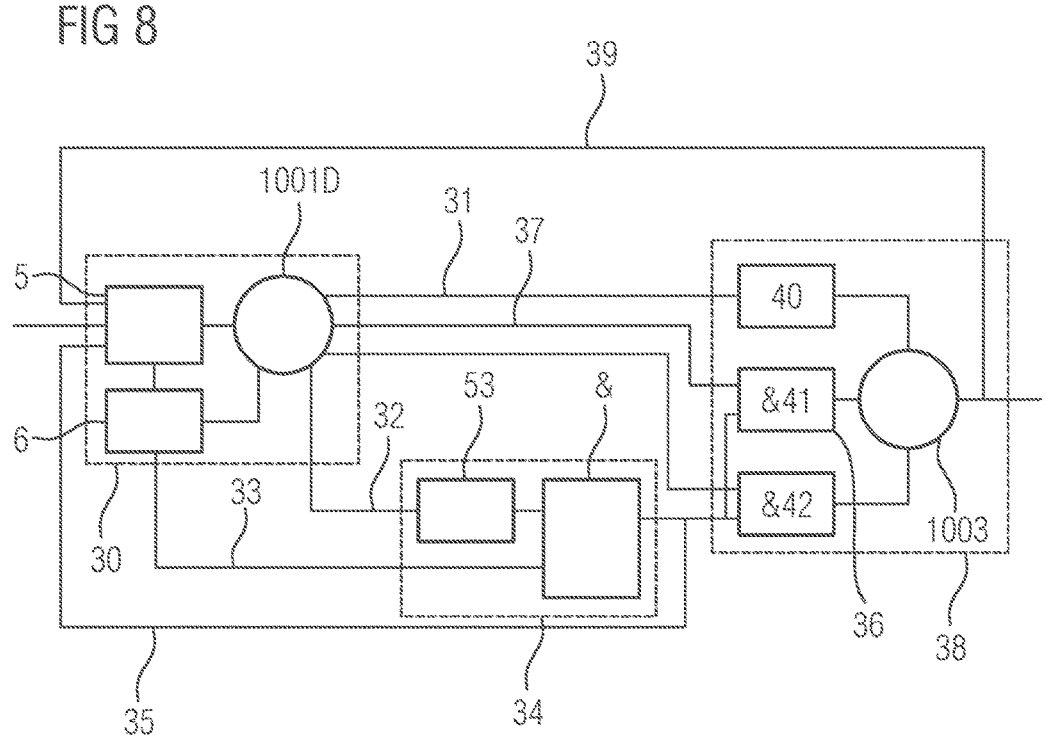
FIG. 8 refers to measures for identifying further randomly occurring second faults, using a block diagram.

In order to be able to identify further randomly occurring second faults, the 1oo1D architecture 30 of FIG. 8 produces two further control signals 32, 33 for the actual output signal 31. The control signals 32, 33 identify here an absence of faults. At least one control signal is a dynamically variable signal. The at least one dynamically variable signal may be tested by a further test block 34.

According to FIG. 8, the test block 34 comprises a monitoring and diagnostic channel 53. Thus, the test block 34 may have a monitoring and diagnostic channel 53 comprising at least one input, wherein the at least one input of the monitoring and diagnostic channel 53 of the test block 34 is configured to receive at least one 32 of the output signals of the monitoring unit 30.

In this case, data values established according to a calculation method and a temporal control mechanism are present in the control signal 32. The temporal control mechanism permits a temporal and logical control. The control signal changes its data value according to a defined algorithm. Thus a high (dynamic) protection from falsification is ensured.

According to one embodiment, the control signal 32 is implemented by question and answer monitoring. In this case, the further test block 34 produces a 4-bit binary value. The 4-bit binary value is transmitted to the 1oo1D architecture 30 on request. The 4-bit binary value changes after each successful test according to the formula: XOR of the bit values X3, X4. It is integrated in X1 for each shift command. Thus the 1oo1D architecture 30 receives a variable task with a cycle of 16 values. As a response to each task (4-bit value) the 1oo1D architecture 30 has to transmit three successive responses (8-bit values) to the test block 34 within a Watchdog window and subsequently a further response outside the Watchdog window. The responses are fixedly defined values and are tested by the test block 34. After four cycles have been completed, the output signal 35 is enabled.

According to FIG. 8, the monitoring unit 30 comprises a monitoring and diagnostic channel 6. Thus, the monitoring unit 30 may have a monitoring and diagnostic channel 6 having at least one output, wherein the at least one output of the monitoring and diagnostic channel 6 of the monitoring unit 30 is configured to provide at least one control signal 33 for the test block 34. The architecture of the monitoring unit 30 may correspond to a 1oo1D architecture.

For proving the effectiveness of the test block 34, the control signals 32 and 33 are changed cyclically by the 1oo1D architecture 30 into a fault signal. This results in an output signal 35. This output signal is tested by a further comparator 36 with a diversely produced signal 37.

In other words, the present disclosure relates to a safety device comprising a monitoring unit 30, a test block 34 and an output stage 38 having at least one contact member &41, wherein the monitoring unit 30 comprises at least two, e.g., at least three, outputs and is configured to provide at least two 32, 37, e.g., at least three 31, 32, 37 different output signals for testing its absence from faults.

In the case of correct signals, the result signal leads to enabling by means of an output stage 38 designed with redundancy.

In other words, the output stage 38 provides a switch-off function by taking into account the result of the linking undertaken by the contact member &41 and the signal activation from the block 30 and 34.

The test block 34 may accordingly be configured to provide at least one feedback signal for the monitoring unit 30.

The monitoring unit 30 may be configured to alter at least one 32 of the output signals of the monitoring unit 30 cyclically into a fault signal for proving the effectiveness of the test block 34.

The monitoring unit 30 may also be configured to alter the control signal 33 on the at least one output of the monitoring and diagnostic channel 6 of the monitoring unit 30 cyclically into a fault signal for proving the effectiveness of the test block 34.

A safe system state may be achieved, for example, in applications in combustion technology by interrupting the power supply and/or energy supply and/or voltage supply of the connected actuators. The power supply and/or energy supply and/or voltage supply are switched off by contact members arranged in series. In some embodiments, enabling only takes place when all contact members are closed.

The output values of all output stages 38 are supplied again as (dynamic) signals 39 to the 1oo1D architecture 30. Therefore, a (dynamic) safety monitoring circuit is produced. In this case, the feedback of the signals 39 may take place individually or as a common signal.

An occurring fault in this case leads to a safety switch-off (of the system).

Thus, the at least one contact member &41 of the output stage 38 may be in an OPEN state or CLOSED state and the output stage 38 comprises at least one output and is configured to provide the state of the at least one contact member &41 as a feedback signal 39 for the monitoring unit 30.

In this case the monitoring unit 30 may comprise at least one input and the at least one input of the monitoring unit 30 is configured to receive a feedback signal 39 from the output stage 38.

The enabling of the contact member 40 takes place in this case directly by means of the 1oo1D architecture 30. The contact member &41 is controlled by two (dynamic) enabling signals from the test block 34 and from the 1oo1D architecture 30. The enabling signal for the contact member &42 requires the dynamics of the test block 34 and the 1oo1D 30 architecture.

In other words, the present disclosure relates to a safety device, wherein the monitoring unit 30 is configured to provide at least one enabling signal 37 for a switch-off function, and wherein the test block 34 is configured to provide at least one enabling signal for a switch-off function and wherein the test block 34 has at least one input and is configured to monitor at least one 32 of the output signals of the monitoring unit 30.

In other words, the test block 34 comprises at least one output and is configured to provide at least one enabling signal 35 for the switch-off function.

In other words, the at least one contact member &41 of the output stage 38 has at least two inputs and is configured to link at least one 37 of the output signals of the monitoring unit 30 to the at least one enabling signal of the test block 34 in order to obtain a result.

The output stage 38 may have at least one further contact member 40 with an input, wherein the at least one further contact member 40 of the output stage 38 is configured to be directly enabled by one 31 of the output signals of the monitoring unit 30.

In this case the output stage (38) may provide its switch-off function by taking into account the enabling by the contact member 40.

Developments are possible and/or provided in the form of parallel contact members &42. To this end, a plurality of activations from the 1oo1D architecture 30 are required. The enabling signal 35 may be used repeatedly.

The principle of the monitoring, therefore, is that only an absence of faults within the whole system is able to result in a system enabling. First faults already result in a switch-off function by means of different safety monitoring circuits.

By means of this built-in architecture, a plurality of safety-relevant functions may be handled in one system. Thus it is possible to monitor a plurality of different types of input signals. A fault in the monitoring system and/or an occurrence of a safety-relevant event thus leads to a safety-relevant system reaction.

The complexity of the monitoring units in this case is reduced to a simple redundant switch-off function. Thus savings are possible relative to safety architectures designed with full redundancy.

Figure 9:
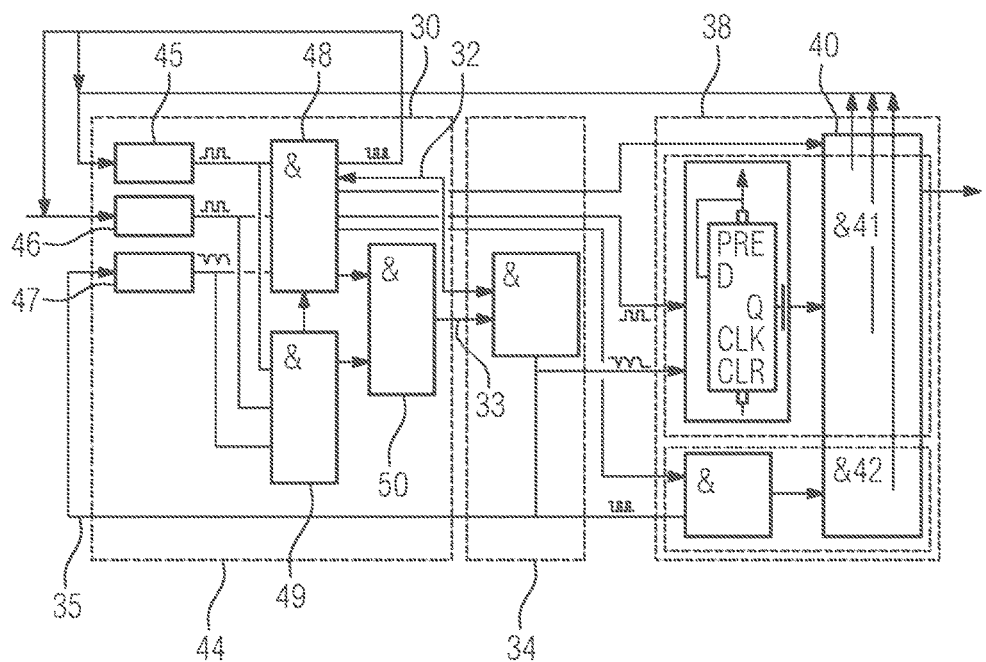
FIG. 9 illustrates as a block diagram the practical implementation of a single-channel architecture with diagnosis by a redundant (multicore) processor.

In the practical implementation according to FIG. 9, the 1oo1D architecture 30 is implemented by an integrated lockstep architecture (a redundant multicore processor) 44. The redundant multicore processor in this case comprises, in addition to three monitoring units 45, 46, 47, a main processor 48 and a test processor 49. Moreover, a comparison element 50 is present.

The redundant (multicore) processor 44 is characterized in that the processing of safety-relevant signals is carried out in a monitored functional channel. The monitoring and diagnostics in this case is of such high quality that faults may be reliably identified.

Suitable redundant (multicore) processors 44 may be obtained from Texas instruments (Hercules series TMS570, RM4x), Freescale (MPC564x series, SPC5744x) or STM (SPC56EL54 series). This list is not definitive.

A plurality of different signals 32, 33 are produced from the redundant (multicore) processor 44. These signals are tested further by a test block 34. In the practical implementation, the test block 34 may be implemented by an integrated switching circuit. The integrated switching circuit performs, for example, a value discrete monitoring and time discrete monitoring of the (dynamic) control signal 32. As a result, the enabling signal 35 is produced. The enabling signal 35 has a defined dynamic.

Suitable monitoring blocks 34 are available, for example, from Texas Instruments (TPS65381) or Freescale (MC33908). This list is not definitive.

This dynamic is required for enabling and/or activation of the contact members &41 and &42 in the output stage 38. This results in the dependency, according to which the result of the first unit 30 is cyclically tested by the second unit 34. A (dynamically produced) test result for enabling the contact members &41 and &42 in the output stage 38 is required together with at least one (dynamic) activation signal from the 1oo1D architecture 30.

Thus, the monitoring unit 30 may comprise at least one input and the at least one input of the monitoring unit 30 is configured to receive a feedback signal 35 from the test block 34 and the monitoring unit 30 is configured to use a feedback signal 35 from the test block 34 which follows a signal 32, 33 from the monitoring unit 30 changed into a fault signal, for proving the effectiveness of the test block 34.

In this case the output stage 38 may be configured to link the feedback signal 35 of the test block to an output signal of the monitoring unit using a contact member &42, in order to undertake a switch-off and/or locking, in the case of non-effectiveness of the test block 34 being proven, using the contact member &42 of the output stage.

Further, the monitoring unit 30 may be configured to provide an output signal 31, 37 when the non-effectiveness of the test block 34 is proven, such that the reception of the output signal 31, 37 by a contact member &41 of the output stage 38 activates the switch-off function of the output stage 38.

According to one embodiment, in the case of the occurrence of a fault in the diagnostic and monitoring unit the output stage 38 is locked. Thus, before the occurrence of a multiple fault, a fault indicator is stored in the memory area of the (multicore) processor 44 and/or in an external memory (e.g., non-volatile). The contents of this memory area are involved with the generation of the control signal 32. Accordingly, in the case of a multiple fault of the 1oo1D architecture 30 a safety locking may take place by means of the test block 34 and the output stage 38.

Thus, the monitoring unit 30 may be configured to store an output signal 31, 37 internally or externally and in a volatile or non-volatile manner, which is suitable for activating the switch-off function of the output stage 38. Further, the monitoring device 30 may be configured to read such a signal from an internal or external and volatile or non-volatile memory. The monitoring device 30 may additionally be configured to evaluate a signal thus read from a memory. The monitoring device may be configured, as a result of the evaluation of the read signal, to provide at least one output signal 31, 37 such that the switch-off function of the output stage 38 is activated and or remains activated. As a result, the output stage is locked or remains locked.

The same applies, irrespective of whether it relates to the output stage 38 and the output signal(s) 39 thereof. Moreover, the output stage 38 may be configured for storage, for reading, for evaluation of a signal with regard to locking.

Figure 10:
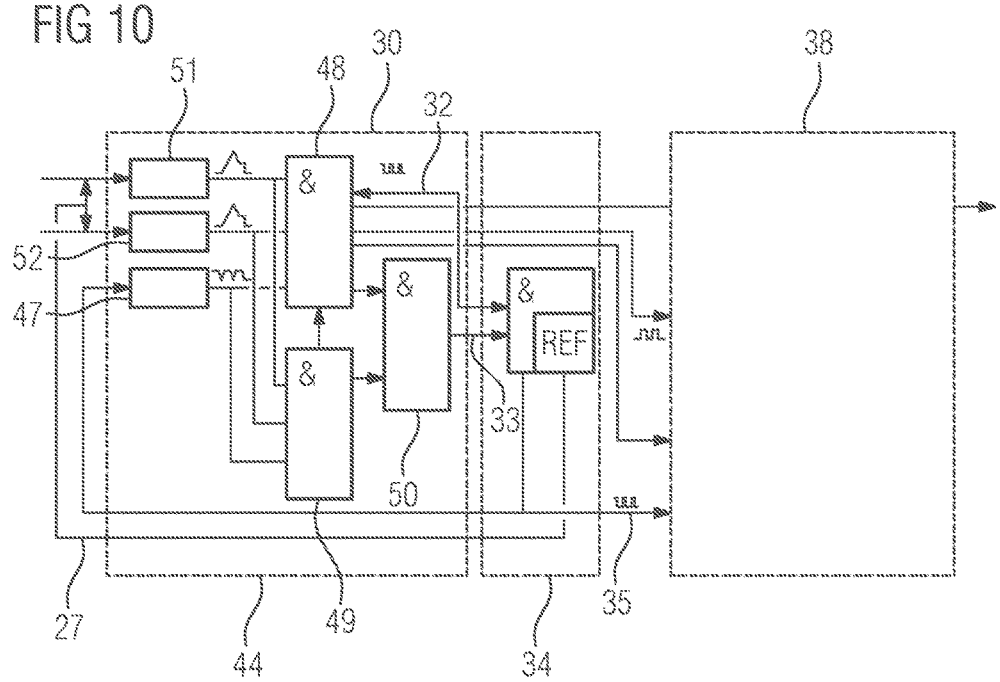
FIG. 10 illustrates using a block diagram the supply of safety-relevant analog signals to a redundant (multicore) processor.

According to FIG. 10, safety-relevant analog signals may be supplied to the safety architecture either by redundant analog/digital converters 51, 52 and/or by a single channel via a signal multiplexer. For testing the functional capacity a defined reference signal 27 is switched to the analog input of the A/D converter via the test block 34 and/or via a variable voltage reference. The test result may be linked in the same manner as before to the generation of the enabling signal 32. The reference signals in this case may be directly switched to the analog input variables and/or via signal multiplexers. The principles of the dynamic testing are in this case maintained.

The monitoring unit 30 accordingly may comprise at least one input for receiving safety-relevant signals. The monitoring unit 30 may comprise at least one analog/digital converter 51, 52 for supplying at least one safety-relevant analog signal.

It is also provided to use a safety architecture according to the present disclosure for controlling and/or regulating and monitoring fuel cells. This use may refer both to solid oxide fuel cells and to polymer electrolyte fuel cells. Moreover, it is possible to use the safety architecture according to the present disclosure for controlling and/or regulating and for monitoring batteries. This refers, in particular, to controlling and/or regulating and monitoring redox flux batteries, such as for example vanadium redox storage batteries, sodium bromide redox storage batteries and/or zinc bromine storage batteries. Also, the control and/or regulation and monitoring of redox flux batteries based on organic quinones is provided.

Parts of a safety architecture or a method according to the present disclosure may be embodied as hardware, as a software module which is implemented by a computer, or using a cloud computer or may be implemented using a combination of the aforementioned possibilities. The software may comprise a firmware, a hardware driver which is implemented within an operating system, or an application program. The present disclosure thus also refers to a computer program product which contains the features of this disclosure and/or implements the required steps. In the implementation as software, the disclosed functions may be stored as one or more commands on a computer-readable medium. Some examples of computer-readable media include random access memory (RAM), magnetic random access memory (MRAM), read-only memory (ROM), flash memory, electronically programmable ROM (EPROM), electronically programmable and erasable ROM (EEPROM), the register of a data processor, a hard drive, an interchangeable memory unit, an optical memory, or any other suitable medium which may be used by a computer or by other IT devices and applications.

The above description refers to individual embodiments of the disclosure. Various alterations to the embodiments may be undertaken without deviating from the idea underlying the invention and without departing from the scope of this disclosure. The subject of the present disclosure is defined by the claims thereof. Different modifications may be undertaken without departing from the protective scope of the following claims.

LIST OF REFERENCE NUMERALS

1 Input
2 Output
3 Monitoring unit
4a Monitoring unit
4b Monitoring unit
5 Monitoring unit
6 Monitoring and diagnostic channel
7 Channel of monitoring unit
8 Channel of monitoring unit
9 Channel of monitoring unit
10 Static signal(s)
11 Additional test signal(s)
12 Input signal(s)
13 Output signal(s)
14 Test signal(s)
15 Useful data
16 Test data
17 Functional unit
18 Functional unit
19 Output driver and/or relay contact
27, 27a, 27b Reference signal(s)
28 Safety-relevant analog signal(s)

29 Monitoring unit for analog signals
30 (1oo1D) architecture
31 Output signal
32 Further control signal
33 Further control signal
34 Test block
35 Output signal
36 Further comparator
37 Diversely produced signal
38 Output stage
39 (Dynamic) feedback signal
40 Contact member
&41 Contact member
&42 Contact member
44 (Multicore) processor
45 Monitoring unit
46 Monitoring unit
47 Monitoring unit
48 Main processor
49 Test processor
50 Comparison element
51 A/D converter
52 A/D converter
53 Monitoring and diagnostic channel

What is claimed is:

1. A safety device, comprising:
a monitoring unit,
a test block, and
an output stage having at least one contact member,
wherein the monitoring unit comprises two outputs and is configured to provide at least two different output signals for testing the monitoring unit for faults,
wherein at least one of the at least two different output signals of the monitoring unit is configured to provide an enabling signal for a switch-off function,
wherein the test block comprises an input and is configured to monitor at least one of the at least two different output signals of the monitoring unit,
wherein the test block comprises an output and is configured to provide an enabling signal for the switch-off function,
wherein the at least one contact member of the output stage has two inputs and is configured to link at least one of the at least two different output signals of the monitoring unit to the enabling signal of the test block to obtain a result, and
wherein the output stage initiates the switch-off function based at least on the result of the linking by the at least one contact member.

2. The safety device of claim 1, wherein:
the test block has a monitoring and diagnostic channel having at least one input, and
the at least one input of the monitoring and diagnostic channel of the test block is configured to receive at least one of the at least two different output signals of the monitoring unit.

3. The safety device of claim 1, wherein:
the monitoring unit comprises a monitoring and diagnostic channel having at least one output, and
the at least one output of the monitoring and diagnostic channel of the monitoring unit is configured to provide at least one control signal for the test block.

4. The safety device of claim 1, wherein:
the output stage comprises at least one further contact member having an input,
wherein the at least one further contact member of the output stage is configured to be enabled directly by one of the at least two different output signals of the monitoring unit.

5. The safety device of claim 4, wherein the output stage provides the switch-off function based at least on the enabling of the at least one contact member.

6. The safety device of claim 1, wherein the test block is configured to provide a feedback signal for the monitoring unit.

7. The safety device of claim 1, wherein the monitoring unit is configured to alter at least one of the at least two different output signals of the monitoring unit cyclically into a fault signal for proving the effectiveness of the test block.

8. The safety device of claim 3, wherein the monitoring unit is configured to alter the at least one control signal on the at least one output of the monitoring and diagnostic channel of the monitoring unit cyclically into a fault signal for proving the effectiveness of the test block.

9. The safety device of claim 6, wherein:
the monitoring unit comprises at least one input configured to receive a feedback signal from the test block, and
the monitoring unit is configured to use a feedback signal from the test block which follows a signal from the monitoring unit changed into a fault signal, for proving the effectiveness of the test block.

10. The safety device of claim 9, wherein the monitoring unit is configured to provide an output signal when the non-effectiveness of the test block is proven, such that the reception of the at least two different output signals activate the switch-off function of the output stage by a contact member of the output stage.

11. The safety device of claim 1, wherein:
the at least one contact member of the output stage is in an open state or closed state, and
the output stage comprises at least one output and is configured to provide the state of the at least one contact member as a feedback signal for the monitoring unit.

12. The safety device of claim 11, wherein the monitoring unit comprises at least one input configured to receive a feedback signal from the output stage.

13. The safety device of claim 1, wherein the monitoring unit is configured to dynamize at least one output signal of the monitoring unit for control purposes using test signals.

14. The safety device of claim 1, wherein:
the monitoring unit comprises at least one input for receiving safety signals, and
the monitoring unit comprises at least one analog-to-digital converter configured to supply at least one safety analog signal.

15. The safety device of claim 1, wherein the monitoring unit comprises at least three outputs and is configured to provide at least three different output signals for testing functions of the monitoring unit.

16. A burner system, comprising:
a safety device comprising:
a monitoring unit,
a test block, and an output stage having a contact member,
wherein the monitoring unit comprises at least two outputs and is configured to provide at least two different output signals for testing faults in the monitoring unit,
wherein at least one of the two different output signals comprises an enabling signal for a switch-off function, wherein the test block comprises an input configured to monitor at least one of the at least two different output signals of the monitoring unit, wherein the test block comprises an output configured to provide at least one enabling signal for the switch-off function, wherein the contact member of the output stage has at least two inputs and is configured to link at least one of the at least two different output signals of the monitoring unit to the at least one enabling signal of the test block to obtain a result, and wherein the output stage provides the switch-off function based at least on the result of the linking by the contact member.

17. A safety device comprising:

a monitoring unit comprising at least one input for receiving safety signals and an analog-to-digital converter supplying an analog safety signal, a test block, and an output stage having at least one contact member, wherein the monitoring unit comprises two outputs and is configured to provide at least two different output signals for testing the monitoring unit for faults, wherein at least one of the at least two different output signals of the monitoring unit is configured to provide an enabling signal for a switch-off function, wherein the test block comprises an input and is configured to monitor at least one of the at least two different output signals of the monitoring unit, wherein the test block comprises an output and is configured to provide an enabling signal for the switch-off function, wherein the at least one contact member of the output stage has two inputs and is configured to link at least one of the at least two different output signals of the monitoring unit to the enabling signal of the test block to obtain a result, and wherein the output stage initiates the switch-off function based at least on the result of the linking by the at least one contact member.

* * * * *